Feb. 1, 1938.     C. R. PATON     2,107,082
MOTOR VEHICLE
Filed Jan. 20, 1934
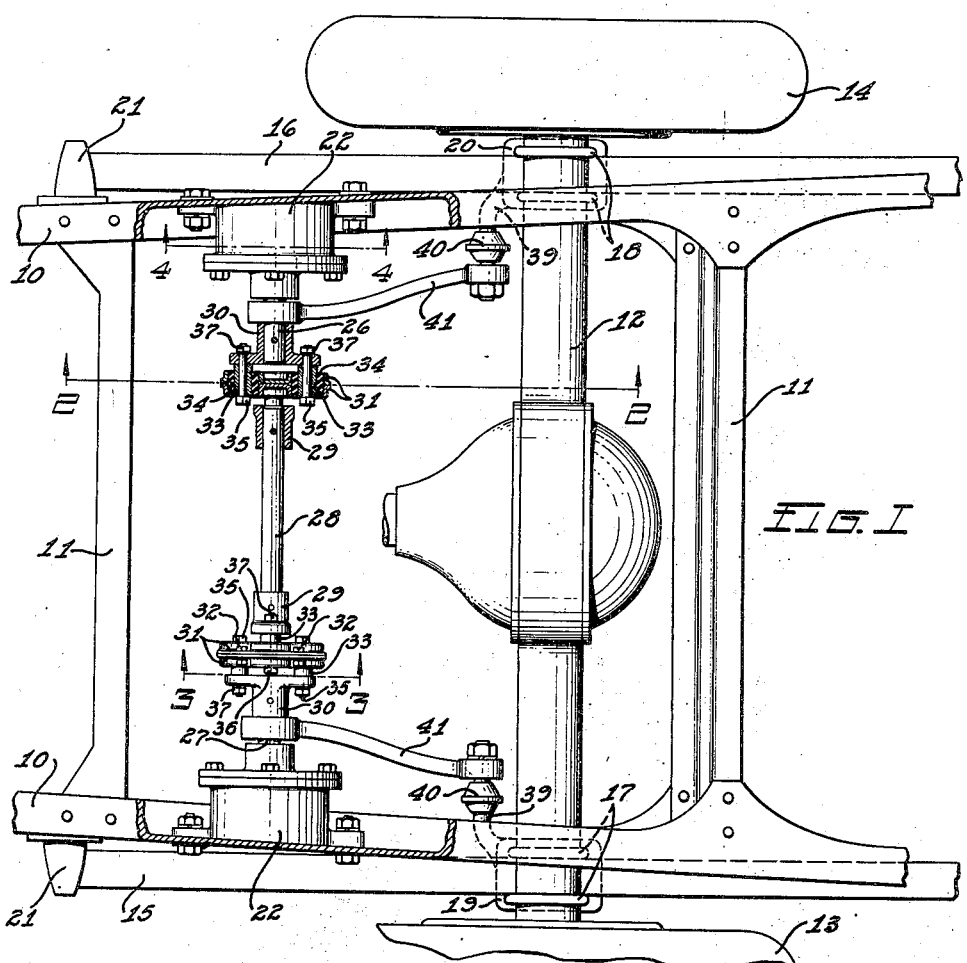
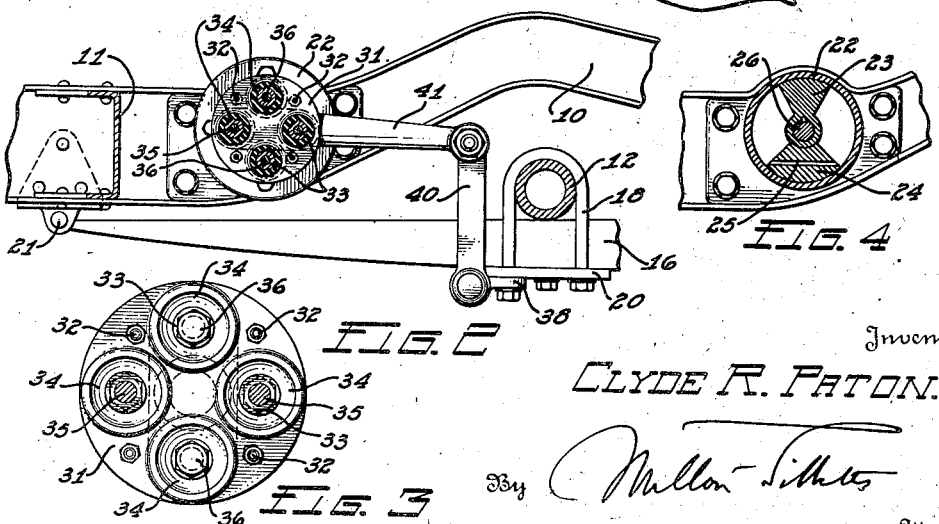
Inventor
CLYDE R. PATON.
By
Attorney Patented Feb. 1, 1938

2,107,082

UNITED STATES PATENT OFFICE 2,107,082

MOTOR VEHICLE

Clyde R. Paton, Birmingham, Mich., assignor to Packard Motor Car Company, Detroit, Mich., a corporation of Michigan Application January 20, 1934, Serial No. 707,450

4 Claims. (Cl. 267—11)

This invention relates to motor vehicles and more particularly to stabilizing mechanism.

With vehicles having a frame or load carrying member flexibly supported by suspension means connected with the wheels, there are circumstances in the operation of the vehicle causing the frame or load carrying member to tilt or sway unless suitable control means is provided. This condition occurs when there is a change in the direction in which the vehicle is traveling and obviously inclination of the vehicle seat is objectionable to occupants.

Various control devices have been proposed to eliminate body sway and one of these consists of connecting the movable portions of opposite shock absorbers so that they will move uniformly and simultaneously. Such a connection eliminates body sway but it increases the roughness of the ride occurring in boulevard travel where there are small irregularities in the road surface. In order to permit slight movement of either wheel without transmitting the motion to the other wheel and to substantially eliminate side sway when changing the direction of vehicle travel, it has been proposed in Patent No. 1,963,689, issued June 19, 1934, to provide a lost motion connection between the shock absorbers.

This invention is an improvement upon the structure shown in the above mentioned Backdahl Patent No. 1,963,689 and has for its object the provision of stabilizing mechanism for a motor vehicle which will allow a limited relative vertical movement between the opposite wheels and at the same time will permit lateral displacement of the connection between the wheels without disrupting the fixed relation of the stabilizing elements with the vehicle parts.

Another object of the invention is to provide a flexible connection between a pair of shock absorbers which is of a character such that the movable parts thereof will have a small independent rotary movement and at the same time will permit a variable lateral spacing of the portions of the shock absorbers fixed to the frame of a vehicle.

A further object of the invention is to provide a stabilizing mechanism in which there is a laterally flexible connection between moving parts of a pair of oppositely disposed shock absorbers.

Other objects of the invention will appear from the following description taken in connection with the drawing, which forms a part of this specification, and which:

Fig. 1 is a fragmentary plan view of the rear end of a motor vehicle partly in section having a stabilizing mechanism incorporating my invention associated therewith;

Fig. 2 is a sectional view of the same taken on line 2—2 of Fig. 1;

Fig. 3 is another vertical sectional view taken on line 3—3 of Fig. 1 through one of the flexible couplings;

Fig. 4 is a vertical sectional view taken on line 4—4 of Fig. 1 illustrating a form of shock absorber with which my invention is associated.

In the illustrated embodiment of the invention, the rear portion of a frame or carrying member is shown to include a pair of longitudinally extending side sills 10 which are spaced by cross members 11 fixed thereto. Extending transversely of the frame is a rear driving axle carrying housing 12 having rear driving wheels 13 and 14 at the ends thereof and connected to be driven in a conventional manner. End portions of the axle housing are secured to longitudinally extending spring structures 15 and 16 by a pair of spring clips 17 and 18 and clip plates 19 and 20. The ends of the spring structures are pivotally secured to the side sills as indicated at 21.

Stabilizing mechanism is provided between the axle and the frame and includes generally a pair of shock absorbers having inter-connected movable portions.

Fixed to each side sill of the frame is a shock absorber casing 22 with each of which is associated a movable element 23 in the form of a vane or piston. There is also an abutment element 24 fixed in each casing having a duct 25 extending therethrough. The casings are substantially filled with fluid and oscillation of the vanes will force fluid from one side thereof to the other through the ducts 25, the direction of movement depending upon the direction in which the vanes are moving. This form of shock absorber is conventional and a further explanation thereof is not believed to be necessary in this connection.

Between the movable elements of the two shock absorbers is arranged a connection, which in this instance is in the form of an articulated shaft by means of which the movable shock absorber elements are moved together after a limited oscillation of one of the vanes and relative lateral movement of the fixed casings will be compensated for without interfering with the driving connection or the disarrangement of any of the elements of the stabilizing device. Fixed to the shaft sections 26 and 27 and intermediate such shaft sections and in alignment therewith is another shaft section 28. Between the adjacent ends of the shaft sections is a flexible coupling by means of which there can be a limited amount of rotation and axial movement between the shafts 26 and 27.

The couplings are similar and a description of one will suffice. The shaft section 28 has a flanged sleeve 29 fixed to each end thereof and a flanged sleeve 30 is fixed to each end of the shaft sections 26 and 27. Between the adjacent flanged ends of the sleeves 29 and 30 is a fabricated structure consisting of two sheet metal disc sections 31 secured together by bolts 32 and having a plurality of openings extending in an axial direction therethrough for the reception of sleeves 33 and resilient bonding material 34 such as rubber. The rubber is preferably vulcanized to the carrier and to the sleeve. A pair of bolts 35 extend through two opposite sleeves and the flanged end of the sleeve on the shaft section fixed to a vane, while bolts 36 extend through the other two opposite sleeves and the flanged end of the sleeve 29, all of such bolts being secured axially by nuts as indicated at 37. It will be thus seen that the coupling herein described permits adjacent sleeves on the shaft sections to rotate a limited amount relatively before establishing a positive driving connection and that there can be axial movement between the sleeves of the adjacent ends of the shaft sections.

Bolted to each of the clip plates 20 is a bracket 38 having an arm 39 projecting therefrom inwardly of the frame and on each of these arms is mounted a link 40 which is pivotally connected to the end of an arm 41. These arms extend substantially longitudinally of the frame and their forward ends are fixed to the adjacent shaft section 26, 27. Vertical movement of the rear axle housing or the frame will transmit oscillatory motion to the vanes through means of the arms 39, the links 40, the arms 41 and the shaft sections 26 and 27. Fluid in the shock absorber casings will resist oscillation of the vanes and thereby dampen the normal action of the spring structures in both directions of vertical movement.

The shaft structure connecting the shock absorber pistons is formed to distort torsionally and thereby allow a limited relative vertical movement between a wheel and the load supporting means without transmitting a similar movement between the opposite wheel and the load supporting means. The elastic quality of the couplings permit such distortion and in addition to this one of the metal shaft sections, preferably the section 28, is formed of material such that it will distort torsionally. Due to the difference in the characteristics of rubber and metal, the couplings will distort more readily than the shaft so that the major distortion of the couplings will occur during the initial distortion of the shaft section. As a consequence, one shock absorber piston can move relative to the other against resistance which is relatively slight and continued relative movement will be gradually resisted to a much greater degree until the pistons move together. It will thus be seen that, when one wheel of the vehicle encounters small irregularities in a road surface, it is free to move vertically without transmitting a similar movement to the other wheel and thus boulevard riding is smooth. At the same time, the torsion of the shaft section will resist sudden increased vertical movement of one wheel so that within certain limits the movement of one wheel will not be transferred to any material extent to the other wheel. The shaft will, however, function to prevent tilting of the body to any appreciable extent.

There is a certain amount of frame twisting which is much more pronounced with independently mounted front wheels than with interconnected front wheels. In view of distortion of the frame structure, relative movement of the side sills having the shock absorber casings fixed thereto tends to distort the interconnected stabilizing mechanism but with the flexible couplings, of the type herein described, the side sills of the frame can move laterally relatively without interfering with the driving connection between the moving parts of the shock absorbers and without disturbing the connections of the shock absorber casings with the frame or the effective relation of other elements of the stabilizing system.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a vehicle having a pair of oppositely disposed wheels, stabilizing mechanism comprising a shock absorber for each wheel, said shock absorbers being mounted on the vehicle in transversely spaced relation and each shock absorber having a movable portion, and torsion shaft means interconnecting the movable portions of said shock absorbers, said shaft means having a flexible section fixed therein permitting elongation and contraction thereof transversely of the vehicle.

2. In a vehicle having a pair of oppositely disposed suspended wheels, stabilizing mechanism comprising a shock absorber for each wheel having a movable section, and means connecting the movable portions of said shock absorbers including a connection flexible to stretch or contract transversely of the vehicle.

3. In a vehicle having a pair of oppositely disposed suspended wheels, stabilizing mechanism comprising a shock absorber for each wheel having a movable portion, and a driving connection between the movable portions of said shock absorbers, said connection having a rubber section flexible to stretch or contract transversely of the vehicle relative to its position of rest.

4. In a vehicle having a pair of oppositely disposed suspended wheels, stabilizing mechanism comprising a shock absorber for each wheel having a movable portion, and a driving connection between the movable portions of said shock absorbers, said connection having a rubber section intermediate its ends allowing limited relative rotation of said movable shock absorber portions and relative movement of the same portions of said shock absorbers transversely of the vehicle in either direction from normal position.

CLYDE R. PATON.